United States Patent [19]
Sawatari et al.

[11] Patent Number: 6,141,098
[45] Date of Patent: Oct. 31, 2000

[54] FIBER OPTIC TEMPERATURE SENSOR

[75] Inventors: Takeo Sawatari, Bloomfield Hills; Philip A. Gaubis, Walled Lake, both of Mich.

[73] Assignee: Sentec Corporation, Walled Lake, Mich.

[21] Appl. No.: 09/167,138

[22] Filed: Oct. 6, 1998

Related U.S. Application Data

[62] Division of application No. 08/791,025, Jan. 27, 1997, Pat. No. 5,870,511.
[60] Provisional application No. 60/010,756, Jan. 29, 1996.
[51] Int. Cl.$^7$ .................................................. G01B 9/02
[52] U.S. Cl. ........................ 356/345; 356/35.5; 356/352
[58] Field of Search .................................... 356/352, 345, 356/35.5

[56] References Cited

U.S. PATENT DOCUMENTS

| | | | |
|---|---|---|---|
| 4,198,119 | 4/1980 | Uberbacher | 350/96.2 |
| 4,201,446 | 5/1980 | Geddes et al. | 350/96.29 |
| 4,223,226 | 9/1980 | Quick et al. | 250/458 |
| 4,278,349 | 7/1981 | Sander | 356/44 |
| 4,295,739 | 10/1981 | Meltz et al. | 356/43 |
| 4,574,172 | 3/1986 | Burack et al. | 219/10.49 R |
| 4,755,668 | 7/1988 | Davis | 250/227 |
| 4,983,333 | 1/1991 | Blew | 264/1.5 |
| 5,035,511 | 7/1991 | Berthold | 374/124 |

(List continued on next page.)

OTHER PUBLICATIONS

"Influence of High Temperatures on a Fiber–Optic Probe for Temperature Measurement," E. Milcent, g. Olalde, J.F. Robert, D. Hernandez, and M. Clement, *Applied Optics*, vol. 33, No. 25, Sep. 1994.

"A Fluorescence–Based Fiber Optic Temperature Sensor for Aerospace Applications," Shelle Dawn Tilstra, SPIE vol. 1589 Specialty Fiber Optic Systems for Mobile Platforms (1991).

A. Wang, S. Gollapudi, R.G. May, K.A. Murphy, and R.O. Clause, "Advances in Sapphire–Fiber–Based Intrinsic Interferometric Sensors," Optic Letters, vol. 17, No. 21, Nov. 1, 1992, pp. 1544–1546.

Anbo Wang, George Z. Wang, Kent A. Murphy, and Richard O. Claus, "Fiber–Optic Temperature Sensors Based on Differential Spectral Transmittance/Reflectivity and Multiplexed Sensing Systems," Applied Optics, vol. 34, No. 13, May 1, 1995, pp. 2295–2300.

Anbo Wang, Sridhar Gollapudi, Kent A. Murphy, Russell G. May, and Richard O. Claus, "Sapphire–Fiber–Based Instrinsic Fabry–Perot Interferometer," Optic Letters, vol. 17, No. 14, Jul. 15, 1992, pp. 1021–1023.

Margaret Tuma, Kristie Elam, Takeo Sawatari, Phil Gaubis and Yuping Lin, NASA Technical Memorandum 113172, "Fabry–Perot Fiber–Optic Temperature Sensor System," Prepared for the 17th International Congress on Instrumentation in Aerospace Simultation Facilities sponsored by the Naval Postgraduate School, Monterey, CA, Sep. 29—Oct. 2, 1997.

*Primary Examiner*—Robert H. Kim
*Attorney, Agent, or Firm*—Kevin G. Mierzwa; Artz & Artz, P.C.

[57] ABSTRACT

A fiber optic temperature sensor uses a light source which transmits light through an optical fiber to a sensor head at the opposite end of the optical fiber from the light source. The sensor head has a housing coupled to the end of the optical fiber. A metallic reflective surface is coupled to the housing adjacent the end of the optical fiber to form a gap having a predetermined length between the reflective surface and the optical fiber. A detection system is also coupled to the optical fiber which determines the temperature at the sensor head from an interference pattern of light which is reflected from the reflective surface.

20 Claims, 4 Drawing Sheets

U.S. PATENT DOCUMENTS

| | | | |
|---|---|---|---|
| 5,051,590 | 9/1991 | Kern et al. | 250/339 |
| 5,051,595 | 9/1991 | Kern et al. | 250/458.1 |
| 5,087,124 | 2/1992 | Smith et al. | 356/358 |
| 5,140,609 | 8/1992 | Jensen et al. | 374/161 |
| 5,143,531 | 9/1992 | Kramer | 65/3.11 |
| 5,193,133 | 3/1993 | Schofield et al. | 385/85 |
| 5,202,939 | 4/1993 | Belleville et al. | 385/12 |
| 5,211,480 | 5/1993 | Thomas et al. | 374/161 |
| 5,255,980 | 10/1993 | Thomas et al. | 374/161 |
| 5,295,206 | 3/1994 | Mischenko | 385/12 |
| 5,311,274 | 5/1994 | Cole, Jr. | 356/133 |
| 5,351,268 | 9/1994 | Jensen et al. | 374/131 |
| 5,355,423 | 10/1994 | Phillips | 385/12 |
| 5,400,140 | 3/1995 | Johnston | 356/345 |
| 5,401,958 | 3/1995 | Berkcan | 250/227.23 |
| 5,401,959 | 3/1995 | Berkcan | 250/227.23 |
| 5,438,873 | 8/1995 | Wlodarczyk et al. | 73/705 |
| 5,477,323 | 12/1995 | Andrews et al. | 356/345 |
| 5,499,313 | 3/1996 | Kleinerman | 385/123 |
| 5,570,441 | 10/1996 | Filas et al. | 385/43 |
| 5,616,214 | 4/1997 | Leclerc | 162/49 |
| 5,658,364 | 8/1997 | DeVore et al. | 65/431 |
| 5,696,863 | 12/1997 | Kleinerman | 385/123 |

FIBER OPTIC TEMPERATURE SENSOR

RELATED APPLICATION

The application is a division of Ser. No. 08/791,025 filed Jan. 27, 1997 now U.S. Pat. No. 5,870,511 and related to copending provisional application No. 60/010,756 filed Jan. 29, 1996.

STATEMENT AS TO RIGHTS TO INVENTIONS MADE UNDER FEDERALLY SPONSORED RESEARCH AND DEVELOPMENT

A portion of the work described herein was supported by the National Aeronautics and Space Administration (NASA) under contract NAS3-27202.

BACKGROUND OF THE INVENTION

The present invention relates generally to a temperature sensor and, more specifically, to a fiber optic temperature sensor capable of measuring a wide range of temperatures.

In various applications such as supersonic or hypersonic aircraft, it is desirable to measure temperatures over a large temperatures range using a single sensor. The desired temperature range for such applications may reach as low as −50° C. and extend up to about 1,000° C.

Conventional temperature measuring devices such as thermistors, thermocouples and bi-metal type devices are undesirable for use in aircraft applications. Such devices are vulnerable to electromagnetic interference, are heavy and may cause sparking.

Sensors employing optical fibers have been used for various applications. Fiber optic sensors are lighter in weight than conventional sensors, are not susceptible to electromagnetic interference, possess larger band widths and have increased safety due to being less susceptible to sparking. Known fiber optic sensors include pyrometric sensors which measure the radiant energy from a body. Pyrometric sensors are particularly suited for relatively high temperatures. Florescent decay sensors are another type of fiber optic sensors. One problem with these conventional fiber optic sensors is that they possess inadequate dynamic range, lack measurement stability and have an unacceptably short lifetime.

One problem common to all temperature sensing devices is that complex calibration procedures are required when the devices are replaced. Such calibration procedures require a significant amount of time to implement in the aircraft industry. In particular, an easy or no calibration procedure is highly desirable so that a sensor may easily be removed and replaced while requiring a minimum amount of aircraft down time.

It is therefore desirable to provide a temperature sensor which has a large temperature range is immune from electromagnetic interference, is lightweight, accurate and long-lived.

SUMMARY OF THE INVENTION

One feature of the present invention is a temperature sensor which utilizes a light source which transmits light through an optical fiber to a sensor head received at the opposite end of the optical fiber from the light source. The sensor head has a sensor housing coupled to the end of the optical fiber. A metallic reflective surface is coupled to the housing adjacent the end of the optical fiber to form a gap having a predetermined length between the reflective surface and the optical fiber. A detection system is also coupled to the optical fiber which determines the temperature at the sensor head from an interference pattern of light which is reflected from the reflective surface.

One feature of the present invention employs a two portion reflective surface. The first portion of the reflective surface is made of a first metal and the second portion of the reflective surface is made of a second metal. The metals preferably have a different coefficient of thermal expansion so that an interference pattern is reflected into the end of the optical fiber.

In another feature of the present invention, the interference pattern of light is generated from the combination of light reflecting from a homogenous reflective material and reflecting from the end of the optical fiber.

In yet another feature of the invention, the light detector system may be housed on a computer board. The light detector system may be formed of a plurality of charge coupled devices so that the interference pattern may be measured and a temperature determined therefrom.

In yet another feature of the invention a connector may be used to connect the detection system with the sensor head, that is, one-half of the connector and optical fiber having the desired length and the sensor head may be an individual unit which may be calibrated separately in a remote location than at the point of installation. The connector associated with the sensor head may contain a memory chip which stores the calibration data therein when the connector is connected to the detection system, the memory chip is read so that the temperature may be determined. The memory chip may, for example, contain a lookup table containing data for fringes at various temperatures for example, at a spacing of 5°. To determine a temperature the fringe profile is measured from the sensor and is subtracted from each of the profiles in the lookup table. The closest profile in the lookup table is determined by subtracting each of the profiles in the lookup table from the data measured from the sensor. When the data are subtracted, the nearest zero is determined to be the temperature. If the temperature is between two measurements, an interpolation may be performed to more exactly determine that temperature.

One advantage of the present invention is that the calibration can be performed in a controlled environment prior to operation of the sensor. An old sensor can be removed and the new sensor placed into a system. The calibration data will then be read by the system to perform temperature calculations.

Another advantage of the present invention is that if the sensor passes through a reference temperature, the data stored in the computer. The update process compensates for any aging effects one may experience.

In yet another feature of the invention, a method for manufacturing a temperature sensor head comprises affixing a reflector in a housing and placing a hollow tube around the optical fiber. The method also includes coupling the first end of the optical fiber to the housing a predetermined distance from the reflector. The method for assembly further includes coupling the tube to the housing and coupling a fitting around the optical fiber. The method also includes coupling the fitting to the hollow tube.

In one aspect of the method of assembly the sensor head assembly may be inserted into a protective sheath to enhance vibration resistance and thermal conductance. The space between the sheath and the sensor head may be filled with a thermally conductive and vibration damping powder.

BRIEF DESCRIPTION OF THE DRAWINGS

Other features and advantages of the present invention will become apparent from the following detailed description which should be read in conjunction with the drawings in which.

DETAILED DESCRIPTION OF THE PREFERRED EMBODIMENT

Figure 1:
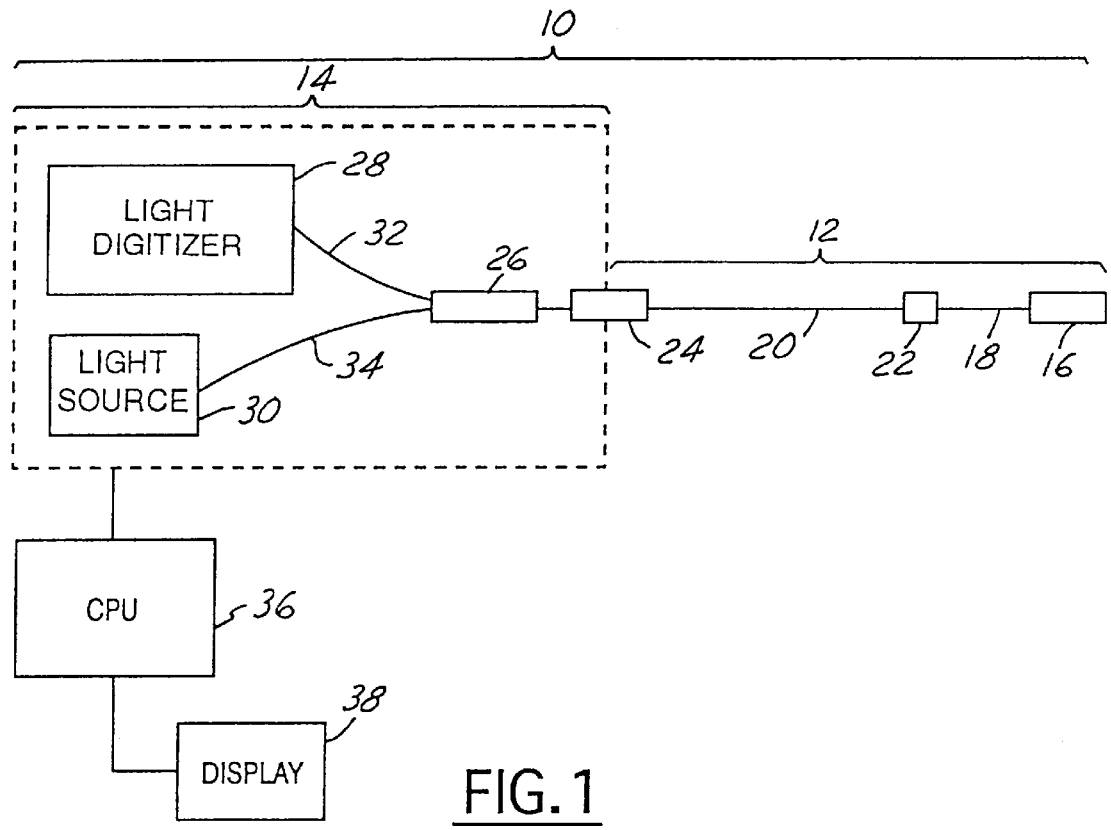
FIG. 1 is a diagrammatic view of a fiber optic temperature measuring system according to the present invention.

Referring now to the drawings like reference numerals are used to identify identical components in the various views. Although the invention will be illustrated in the context of a fiber optic sensor having a large temperature range, it will be appreciated this invention may be used with other applications requiring less temperature range.

Referring now to FIG. 1, a temperature sensing system 10 has a sensor unit 12, a light transmitting and receiving unit 14. Sensor unit 12 extends to the location in which the temperature is to be measured. Sensor unit 12 provides a light interference pattern to light transmitting and sensing unit 14. Light transmitting and receiving unit 14 converts the interference pattern into a temperature reading.

Sensor unit 12 generally comprises a sensor head 16, a first optical fiber 18, a second optical fiber 20, a sensor head connector 22 and a sensor unit connector 24. Sensor head 16 is located at the position where the temperature is to be determined. Sensor head 16 may, for example, be placed in the exhaust gas stream of a jet engine. First optical fiber 18 is connected between sensor head connector 22 and sensor head 16. First optical fiber is preferably formed of a high temperature resistant optical fiber such as sapphire. Sapphire is used only for the very end of the sensor which will be subject to high temperatures since sapphire has low transmissivity and is relatively inflexible. The refractive index of sapphire is about 1.77. Second optical fiber 20 is preferably a silica based optical fiber. Second optical fiber connects sensor head connector 22 to sensor unit connector 24. Silica based optical fiber is more flexible and cheaper than sapphire based optical fiber. Silica fiber also has a somewhat lower refractive index of about 1.48. Consequently, it is preferred that the majority of the distance between sensor head 16 and sensor unit connector 24 is made from silica based optical fiber. For simplicity, using a single optical fiber and eliminating sensor head connector 22 may be desirable.

Sensor head connector 22 is preferably formed of a standard butt-coupling optical fiber connector. One example of a suitable connector is an SMA connector, which is common in the industry. Sensor head connector 22 butt-couples first optical fiber 18 to second optical fiber 20.

Light transmitting and receiving unit 14 has a mating half of sensor unit connector 24, an optical coupler 26, a light digitizer 28, a light source 30, an optical fiber 32 and an optical fiber 34. Optical fiber 34 is used to connect optical coupler 26 to light source 30.

Optical coupler 26 is used to couple light generated from light source 30 which is to be transmitted to sensor head 16 through optical fibers 18 and 20. Optical coupler 26 is also used as a beam splitter to send the light modulated by sensor head 16 to light digitizer 28.

Light digitizer 28 may for example be a spectrometer which divides the light up into its wave length components. Light digitizer 28 may use a linear detector such as a series of charge coupled devices (CCD). Light digitizer 28 converts the detected light signal from sensor 16 into a desirable output format.

Light source 30 is preferably a wide band light source such as a white light source. One example of a desirable white light source is a tungsten-halogen source.

Light transmitting and receiving unit 14 may also have a central processing unit (CPU) 36 associated therewith. CPU 36 is used to perform mathematical calculations further described below. With the digitized output of light digitizer 28 a display 38 may be used to display the temperature as calculated by CPU 36 of the sensor head 16. Light digitizer 28 and optical coupler 26 may be contained on a computer board which is inserted into CPU 36. Such a light digitizer is manufactured by Ocean Optics. It is also preferred that light source 30 is contained on such a computer board. However, a standardized board contained a spectrometer and light source was not known at the time of this application.

Figure 2:
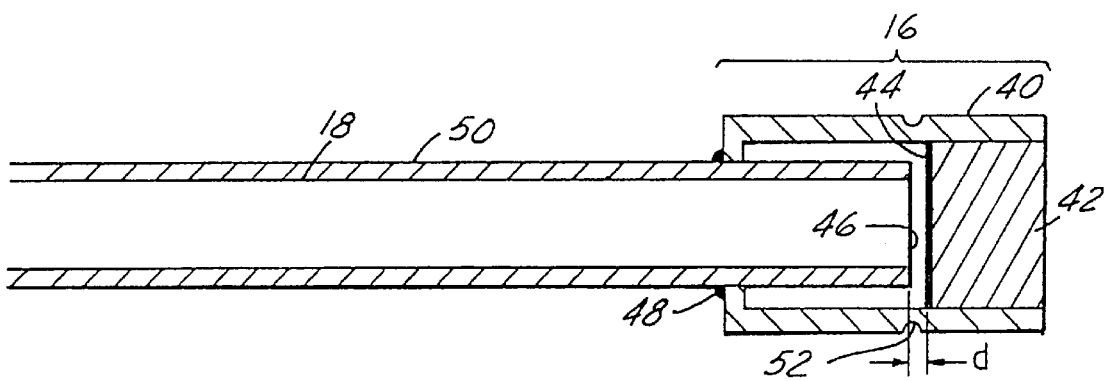
FIG. 2 is a cross-sectional view of a sensor head according to the present invention.

Referring now to FIG. 2, one embodiment of a sensor head 16 is shown. Sensor head 16 has a housing 40 which holds a reflector 42 having a reflective surface 44 a predetermined distance d away from an end 46 of optical fiber 18. Optical fiber 18 is held to housing 40 with a high temperature adhesive 48. In this embodiment light traveling from the light source towards sensor head is reflected by two surfaces and combined to form an interference pattern. Light is reflected at the end surface 46 of optical fiber 18 due to the air-fiber interface. It has been experimentally determined that approximately 4% of the light power is reflected back into the optical fiber 18 from the end surface 46. The remaining light travels out of the end of optical fiber 46 and reflects from reflector surface 44 and re-enters the optical fiber 18. It has been experimentally determined that about 90% of the reflected light re-enters the fiber at end surface 46. The combination of light reflecting from end surface 46 and the light reflecting from reflective surface 44 will generate an interference fringe pattern. The interference fringe pattern is a combination of the reflected light which is superimposed vectorially. The distance d between end surface 46 and reflective surface 44 increases as the temperature increases. This is mainly due to the differences of the coefficients of thermal expansion of the optical fiber 18 and the sensor housing 40. The changing distance d causes the interference pattern to vary as a function of temperature.

Reflector 42 is made of a metallic material so that nearly 100% of the light that reaches the reflector surface 44 is reflected. It is also preferred that the reflector 42 is preferably made of an oxide resistant material so that an oxide does not form on reflective surface 44. If an oxide forms on reflector surface 44 the distance d may be changed and thus a potential error may occur in the measurement. Materials which have been used to form reflector surface 44 include ZGS (a Pt and 10% Rh alloy) and platinum.

Sensor housing 40 is also preferably made of metallic material. Sensor housing 40 may for example be made of ZGS or platinum.

Optical fiber 18 is shown having a cladding 50. It may also be removed in the portion near sensor head 16. Adhesive 48 bonds sensor housing 40 to the optical fiber 18. Adhesive 48 must be capable of withstanding the temperatures that sensor head 16 may be subject to. Adhesive 48 may, for example, be a high temperature cement or a ceramic adhesive. One example of an acceptable ceramic adhesive is made by Cotronics and is called RESPOND CERAMIC ADHESIVE 904HP.

Sensor housing 40 may have a U-shaped groove 52 which circumscribes the housing adjacent to the distance d between end surface 46 and reflective surface 44. U-shaped groove 52 may be used to bend or manipulate the housing and thus bend the orientation of the first optical fiber 18 with respect to reflective surface 44. A slight bend at U-shaped groove 52 may be used to permanently set the maximum visibility.

Reflective surface 46 is preferably planar and smooth. It is preferred that reflective surface be polished for example by a conventional polishing process to obtain a smooth interface. Polishing may be accomplished by using a diamond paste.

Figure 3:
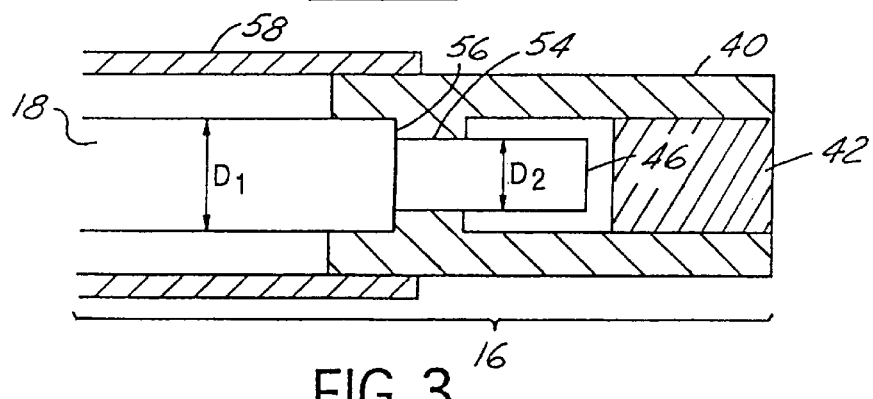
FIG. 3 is a cross-sectional view of an alternative embodiment of a sensor head.

Referring now to FIG. 3, an alternative sensor head 16 is shown. In this embodiment the optical fiber 18 is not secured to housing 40 using an adhesive. Housing 40 has an integrally formed receptacle portion 54 which is used to hold a shoulder 56 formed in optical fiber 18. One method for forming shoulder 56 and optical fiber 18 is to etch the end of optical fiber 18. Etching may be accomplished by dipping the end 46 into a potassium hydroxide for a pre-determined amount of time so that diameter $D_1$ is reduced to diameter $D_2$. To stop the etching process a stop-off material may be applied to optical fiber 18 when diameter $D_2$ is reached.

Figure 4:
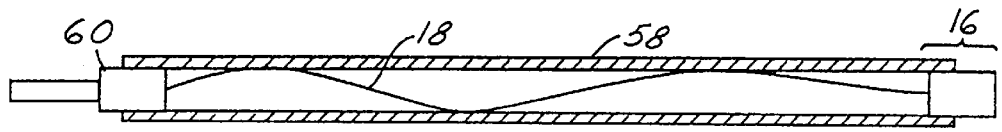
FIG. 4 is a connection method for connecting a sensor head to an optical fiber connector.

Referring now to both FIGS. 3 and 4, sensor head 16 is coupled to an outer tube 58. The opposite end of outer tube 58 is connected to a connector 60. Outer tube 58 is preferably formed of a material stable in the heat experienced by sensor head 16. Optical fiber 18 extends between fiber connector 60 and sensor head 16 within outer tube 58. Optical fiber 18 is longer than the distance between connector 60 and sensor head 16. Optical fiber 18 is squeezed into outer tube 58 so that the bending of the optical fiber 18 provides a spring force to the shoulder 56 of optical fiber. This spring force will hold shoulder 56 against receptacle 54 without the necessity of a bonder. Both connector 60 and sensor head 16 may be bonded in an appropriate manner to outer tube 58.

Figure 5:
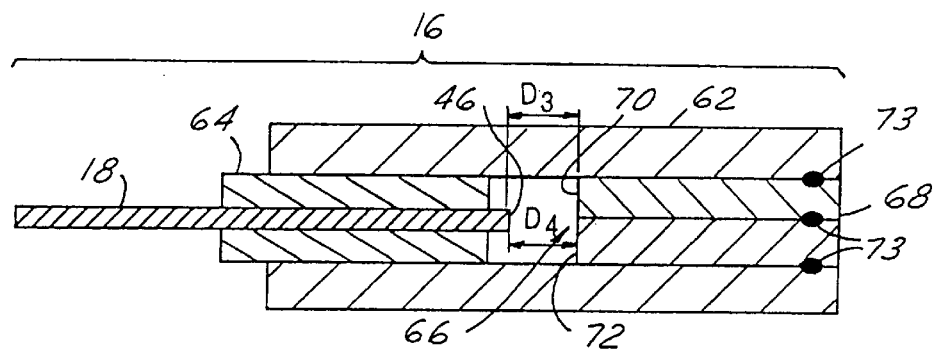
FIG. 5 is another alternative cross-sectional view of a sensor head.

Referring now to FIG. 5, another alternative embodiment of sensor head 16 is shown. In this embodiment sensor head 16 has outer tube 62. Surface 46 of optical fiber 18 is held by holder tube 64 a pre-determined distance from reflective surface 66 of reflector 68. Reflective surface 66 is preferably formed of a first portion 70 and a second portion 72. Each portion has a different coefficient of thermal expansion. First portion 70 may be formed of stainless steel. Second portion 72 may be formed of Inconel 601. First portion 70 and second portion 72 may be a pair of half round rods. First portion 70 and second portion 72 may be welded together at welds 73, for example, at one end of outer tube 62.

In this embodiment, the optical fiber 18 transmits a light to be reflected from both the first portion 70 and second portion 72 of reflective surface 66. As the temperature of sensor head 16 increases, the distance $D_3$ becomes different than distance $D_4$. The difference in distances will cause light emitted by optical fiber 18, once reflected by first portion 70 and second portion 72, to form an interference fringe pattern. The corresponding change in the distances $D_3$ and $D_4$ corresponds to the temperature of the sensor head 16.

Figure 6:
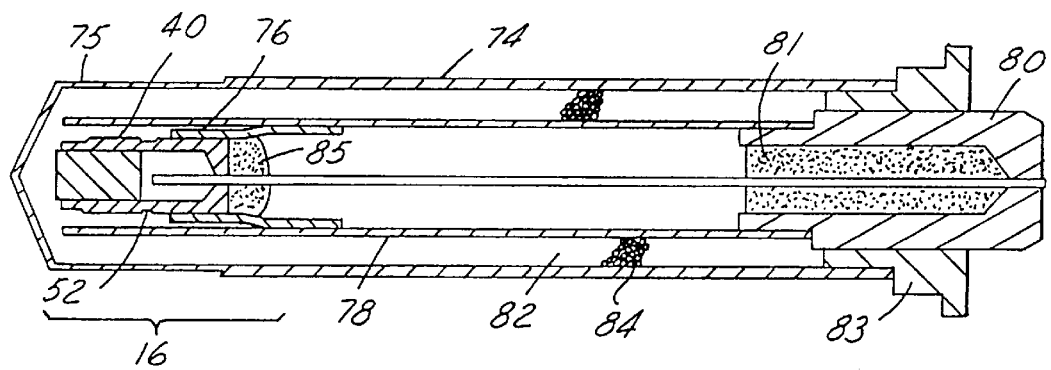
FIG. 6 is a cross-sectional view of another embodiment of a sensor head in a protective sheath.

Referring now to FIG. 6, a sheath 74 may be used to protect sensor head 16 from damage. A tip portion 75 of the sheath 74 may be shaved thin to increase heat conduction. As shown, sensor head 16, similar to that of FIG. 2, is shown. Like numerals from that of FIG. 2 will be used to number like components in FIG. 6. Sensor head configurations such as that shown in FIGS. 3, 4 and 5 may also be utilized in this configuration. A first tube 76 is coupled to housing 40 with cement 85. First tube 76 may, for example, be made of a metallic materials such as platinum. A second tube 78 which is preferably made of stainless steel is used to connect first tube 76 to a ferrule 80. In this embodiment, it is preferred that housing 40 and first tube 76 are made of the same material for example platinum. First tube 76 may be spot welded to housing 40. First tube 76 is inserted into the second tube 78 so that any coefficient of thermal expansion mismatch causes no harm. The ferrule 80 is then connected to second tube 78 by spot welding. The ferrule 80 may be connected to sapphire fiber with cement 81. Prior to assembly, if required, a slight bend may be made in housing 40 at U-shaped grooves 52 to obtain maximum fringe visibility. Sheath 74 may then be slid onto ferrule 80.

The cavity 82 between second tube 78 and sheath 74 may be filled with a powder 84 to absorb shock and promote thermal transfer to housing 40. Powder 84 may be made from a material such as BN or MgO. Once cavity 82 is filled with powder 84, collar 83 may be bonded to sheath 74 and ferrule 80. The collar 83 may support SMA connector. Second tube 78 helps minimize thermal transport to ferule 80 and also acts as a heat sink for heat transported down the sapphire fiber.

Figure 7:
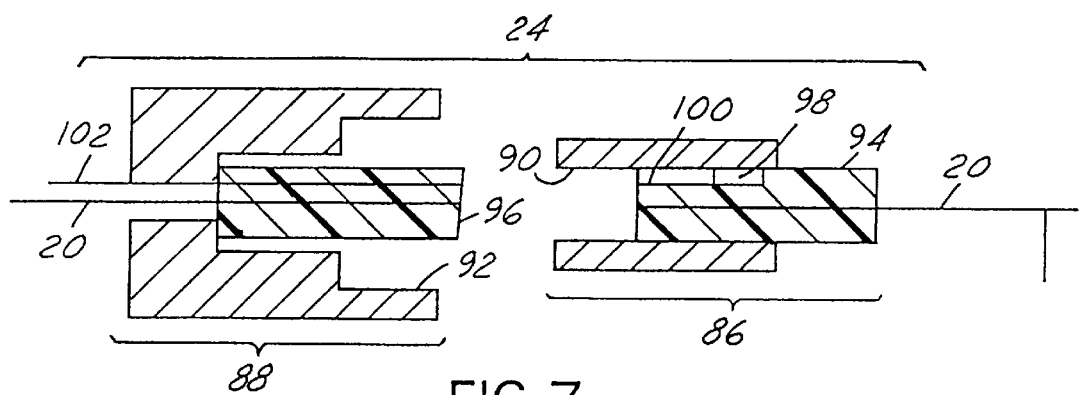
FIG. 7 is a cross-sectional view of a connector used to connect the sensor unit to a detection system.

Referring now to FIG. 7, connector 24 is shown in more detail. Connector 24 preferably has a male portion 86 and a female portion 88. Male portion 86 is used to connect optical fiber 20 eventually to sensor head 16. Female portion 88 may be a connector mounted on a computer board. Male portion 86 may have threads 90 which are used to couple to threads 92 on female portion 88. It is preferred that both sets of threads 90 and 92 are formed of a metallic material. Male portion 86 may have an optical fiber holder 94 which is connected to threads 90. Female portion 88 may also have a holder 96 to hold optical fiber 20.

In day to day use, male portion 86 will be associated with a single sensor head and its associated optical fiber. Male portion 86 can be removed to change sensor head 16. To change sensor head 16 a new male portion, optical fiber and sensor head are all replaced.

Male portion 86 contains a memory chip 98. Memory chip 98 is used to store calibration data for the particular sensor head as will further be described below. Memory chip 98 is coupled through an electrode 100 in male portion 86. When male portion 86 is connected to female portion 88 it is preferably connected to an electrode 102 and female portion 88. When male portion 86 is connected to female portion 88, the information contained in memory chip 98 is used by the CPU to calculate the temperature based on the interference fringe pattern reflected from sensor head 16. Threads 90 and threads 92 are preferably formed a metallic material so that the metal may act as a ground for memory chip 98. Memory chip 98 may be a read only type memory; however, memory chip may also be a RAM type memory so that the memory may be updated. For example, calibration data stored in memory chip 98 may be renewed each time the sensor head passes through a reference temperature. This would compensate for any deteriorations in the fiber and in the sensor head.

An alternate method to achieve automatic calibration is to replace connector 22 in FIG. 1 with a connector such as that shown in FIG. 7. In this case, optical fiber 20 will require an additional electrical wire and ground connection. With this configuration, optical fiber 20 does not have to be replaced.

Figure 8:
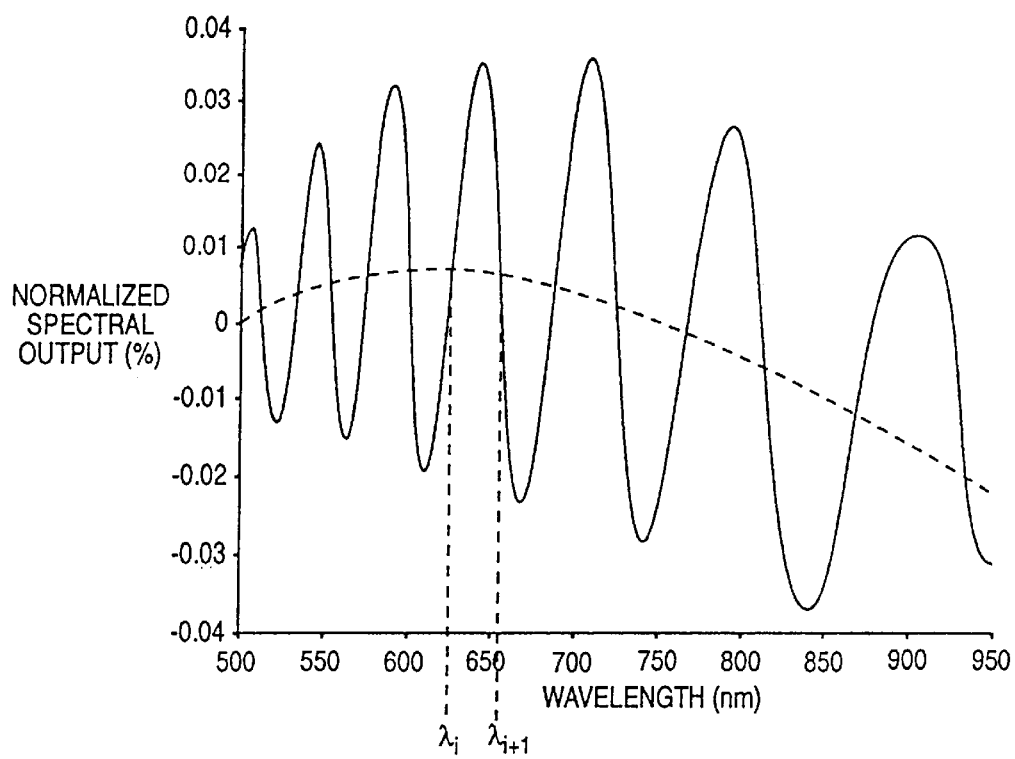
FIG. 8 is a plot of a normalized spectral output versus wave length at a first temperature.

Referring now to FIG. 8, a normalized spectral output is plotted verses wave length in nanometers in the solid line. The interference fringe pattern is normalized by a spectrum obtained at a reference temperature, for example, of 20° C. The dotted line is the average fluctuation. By measuring the spacing between the fringes, that is, the done distance between $\lambda_i$ and $\lambda_{i+1}$, the distance between the end of the fiber and the reflective surface may be determined. The relationship between the distance D and the wavelength $\lambda_i$ and $\lambda_{i+1}$ is expressed mathematically as $d=2(1/\lambda_i-/\lambda_{i+1})$. For a given set of data, the distance d may be redundantly determined to minimize measurement error. From each fringe the value of the distance between the surface of the reflector and the surface of the optical fiber can be redundantly calculated. Once the value for the distance d is obtained, the distance d can be converted into temperature by multiplying the distance d by a conversion coefficient which may be experimentally determined. By using such a method, the reflectivity of the reflective surface only causes an amplitude change in the fringe pattern. The fringe width is not influenced by the reflectivity change, therefore the measurement is not affected. If the deterioration of the surface becomes so severe that a portion of the fringe losses its visibility, that portion of the fringe may be excluded from the calculation.

The fringe pattern (a digital signal) of FIG. 8 is obtained through light digitizer 28. The CPU may then utilize the data for mathematical manipulation and then determine the temperature of the sensor head. The CPU may retrieve the calibration coefficients from the memory chip 98.

Figure 9:
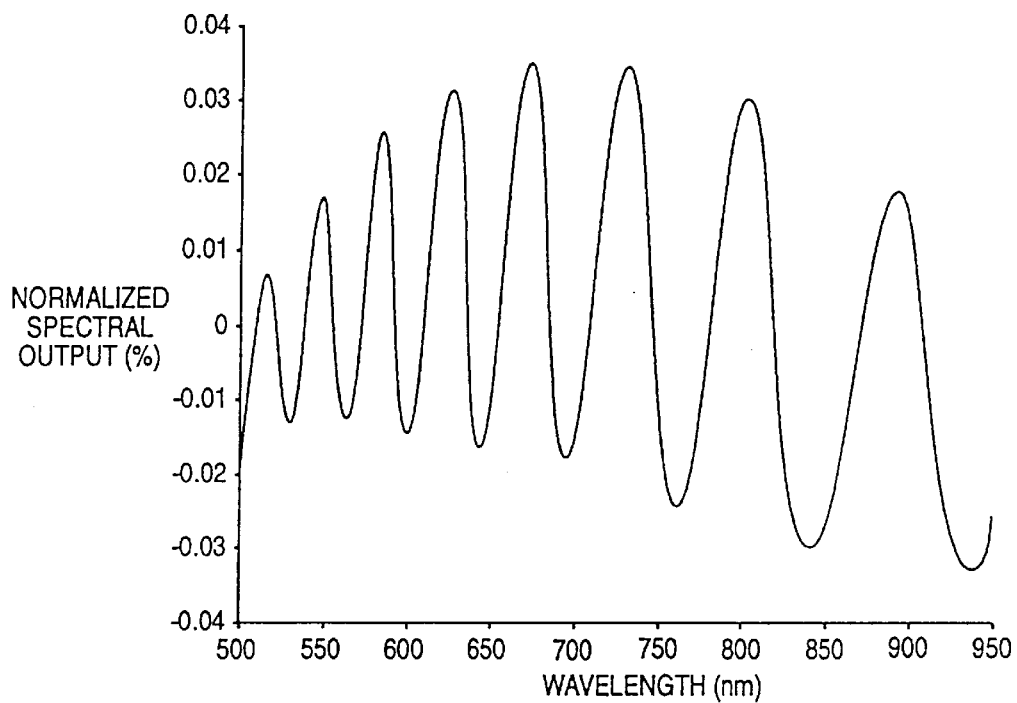
FIG. 9 is a plot of normalized spectral output versus wave length at a higher temperature than that of FIG. 8.

Referring now to FIG. 9, the interference fringe pattern similar to that of FIG. 8 is shown, except at a higher temperature. As the temperature increases, the frequency increases. The desirability of white light is illustrated here since white light puts out a wide spectrum of light. The wider the spectrum of light, the greater the number of interference fringe patterns that are used in the calculations.

Figure 10:
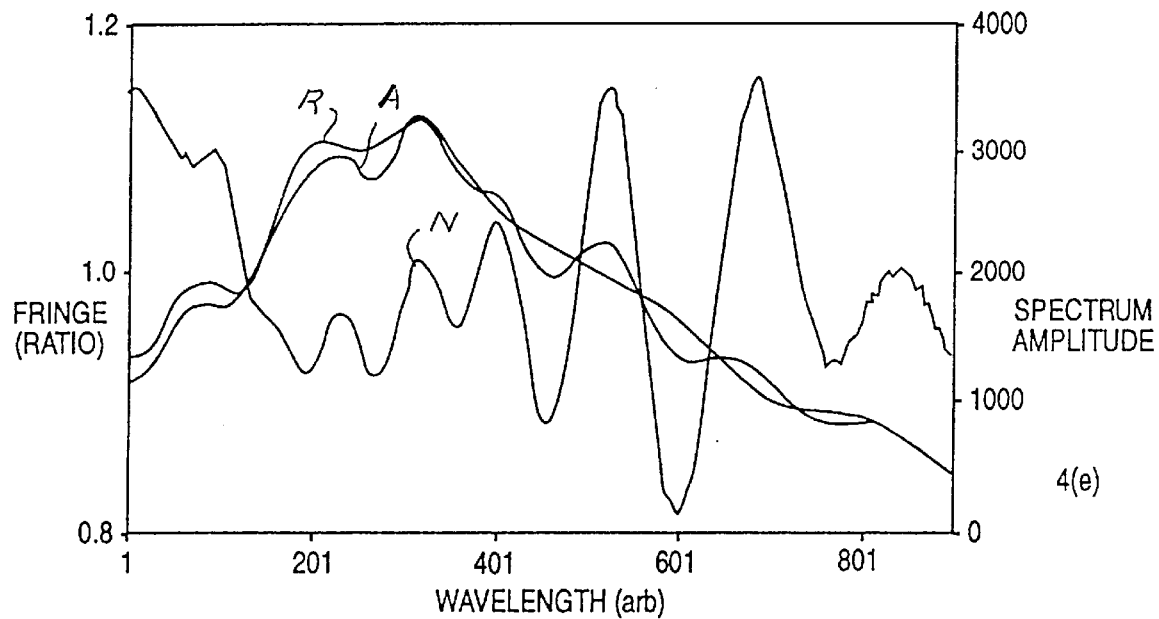
FIG. 10 is a plot of a referenced spectrum, actual temperature spectrum and calculated fringes which are used to calculate temperature.

Referring now to FIG. 10, a reference spectrum pattern R and an actual spectrum pattern A at a particular temperature is plotted with respect to wave length. Also plotted in FIG. 10 is a calculated fringe pattern N which is a normalized fringe pattern. The normalized fringe pattern is calculated by subtracting the reference fringe pattern from the actual data fringe pattern and dividing by the average intensity of the reference pattern.

The calibration data stored in memory chip 98 may contain a plurality of calibration fringe patterns. These calibration fringe patterns may, for example, be taken at regular intervals. The calibration fringe patterns, for example, may be taken at every 0.01° C. However, in many situations memory size is limited. A more practical approach would be to take calibration fringe patterns at approximately every 5° C. Each fringe pattern may have somewhere in the neighborhood of 900 spectral points. The calibration fringe patterns are stored in the memory chip 98 and used by the CPU for its calculation.

The normalized fringe pattern is first obtained for an unknown temperature. The absolute distance of the measured pattern from each of the calibration fringe patterns is calculated for every wave length. The absolute distance values are then summed up.

Figure 11:
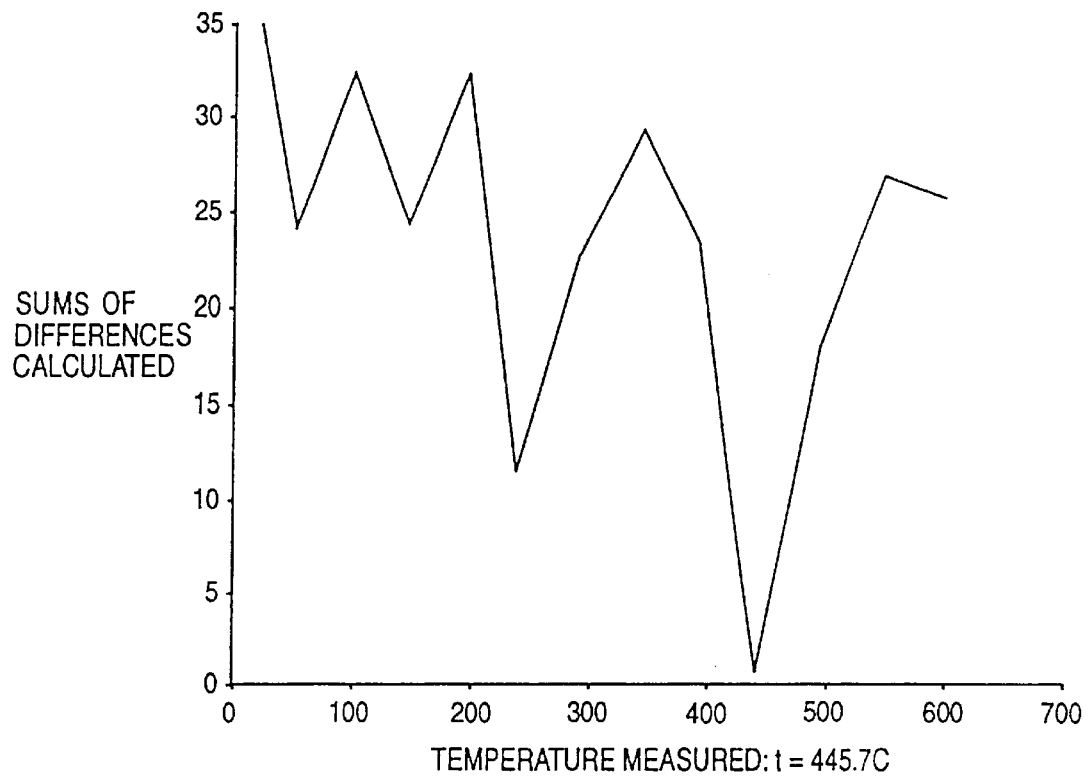
FIG. 11 is a sum of differences of fringe data used to calculate temperature.

Referring now to FIG. 11, a plot of the sums of the absolute difference values is plotted against temperature measured. The absolute distance for the closest calibration pattern would be zero if the calibration pattern matched exactly. It is most likely that the absolute distance will be close to zero but not exactly zero, since data was taken only at every 5° C. An interpolation may be performed to estimate the actual temperature within the 5° range.

When using a 5° interval, the present example measured somewhere between 445° C. and 450° C. Using algebra, the actual temperatures then estimated to be the minimum temperature point of a parabolic approximation. Using the accuracy of such a method was determined within plus or minus 0.3°.

The above methods for calculating a temperature based on the mount of a light reflected from a sensor head may only be performed up to a predetermined temperature since the metallic material that the sensor head is made from may start to glow like a black body. The glowing light contributes to an increase in background noise and determining the temperature range with the background noise becomes overwhelming. The light source may then be switched off and the light digitizer 28 may be used as a pyrometer. The light digitizer can determine the radiant energy (i.e., wave length of light) of the sensor head. This information may be compared to information contained in the memory chip during calibration. When the temperature goes below the predetermined temperature, the light source may then be switched on and the interference fringe patterns are used to calculate a temperature as described above.

While the best mode for carrying out the present invention has been described in detail, those familiar with the art to which this invention relates will recognize various alternative designs and embodiments for practicing the invention as defined by the following claims:

What is claimed is:

1. A method for measuring temperature comprising:
   transmitting light in an optical fiber to a sensor head;
   reflecting a first light from a first surface in said sensor head;
   reflecting a second light from a second surface in said sensor head;
   generating an interference pattern by combining said first light and said second light;
   refracting said interference pattern into wavelengths;
   retrieving calibration data from a memory, said calibration data comprising a plurality of reference patterns corresponding to a plurality of previously measured reference temperatures; and
   determining the temperature by comparing said interference pattern with the calibration data.

2. A method for measuring temperature as recited in claim 1, wherein said step of reflecting a first light comprises the sub-step of reflecting said first light from a reflective surface a predetermined distance from the optical fiber.

3. A method for measuring temperatures as recited in claim 1, wherein the step of reflecting a second light comprises the sub-step of reflecting said second light from an end of said optical fiber.

4. The method for measuring temperature recited in claim 1 wherein said step of reflecting a first light comprises the substep of reflecting said first light from a first portion of a reflective surface, said first portion made of a first material, and said step of reflecting a second light comprises the substep of reflecting said second light from a second portion of said reflective surface, said second portion made of a second material having a different coefficient of thermal expansion than said first material.

5. The method for measuring temperature recited in claim 1 wherein said step of determining the temperature comprises the substeps of:

normalizing said interference pattern; and, comparing said normalized interference pattern to each of said plurality of reference patterns.

6. The method of claim 1 wherein said determining step includes the substeps of:

calculating the difference between said interference pattern and each of said reference patterns at a plurality of points to obtain a plurality of absolute distance values corresponding to each reference pattern;

adding said plurality of absolute distance values corresponding to each reference pattern to obtain a total distance value corresponding to each reference pattern; and, comparing each of said total distance values to a predetermined reference value.

7. A method for measuring temperature, comprising the steps of:

transmitting light through an optical fiber to a sensor head;

detecting an interference pattern generated by said sensor head; and, comparing said interference pattern with a plurality of reference patterns corresponding to a plurality of temperatures.

8. The method of claim 7 wherein said detecting step includes the substeps of:

reflecting a first portion of said light off of a first surface;

reflecting a second portion of said light off of a second surface; and, combining said first and second portions of said light.

9. The method of claim 8 wherein said first surface comprises an end of said optical fiber.

10. The method of claim 8 wherein said second surface is disposed a predetermined distance from said optical fiber.

11. The method of claim 8 wherein said first surface comprises a first material and said second surface comprises a second material, said second material having a different coefficient of thermal expansion than said first material.

12. The method of claim 7 wherein said comparing step includes the substeps of:

normalizing said interference pattern; and, comparing said normalized interference pattern with each of said plurality of reference patterns.

13. The method of claim 7 wherein said comparing step includes the substeps of:

calculating the difference between said interference pattern and each of said reference patterns at a plurality of points to obtain a plurality of absolute distance values corresponding to each reference pattern;

adding said plurality of absolute distance values corresponding to each reference pattern to obtain a total distance value corresponding to each reference pattern; and, comparing each of said total distance values to a predetermined reference value.

14. A method for measuring temperature, comprising the steps of:

transmitting light through an optical fiber to a sensor head;

detecting an interference pattern generated by said sensor head;

normalizing said interference pattern relative to a reference pattern; and, measuring a distance between first and second fringes of said normalized interference pattern, said distance indicative of said temperature.

15. The method of claim 14 wherein said detecting step includes the substeps of:

reflecting a first portion of said light off of a first surface;

reflecting a second portion of said light off of a second surface; and, combining said first and second portions of said light.

16. The method of claim 15 wherein said first surface comprises an end of said optical fiber.

17. The method of claim 15 wherein said second surface is disposed a predetermined distance from said optical fiber.

18. The method of claim 15 wherein said first surface comprises a first material and said second surface comprises a second material, said second material having a different coefficient of thermal expansion than said first material.

19. The method of claim 14 further comprising the step of multiplying said distance by a predetermined conversion coefficient.

20. The method of claim 14, further comprising the steps of:

measuring a second distance between said second fringe and a third fringe of said normalized interference pattern; and, averaging said first and second distances to obtain an average distance, said average distance indicative of said temperature.

* * * * *